United States Patent
Molla

(10) Patent No.: US 7,133,375 B1
(45) Date of Patent: Nov. 7, 2006

(54) DYNAMIC ADAPTIVE MULTIFUNCTIONAL BASE STATION FOR WIRELESS NETWORKS

(75) Inventor: Liton Molla, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 937 days.

(21) Appl. No.: 10/091,654

(22) Filed: Mar. 5, 2002

(51) Int. Cl.
H04B 7/216 (2006.01)

(52) U.S. Cl. .................. 370/320; 370/335; 370/342; 370/441

(58) Field of Classification Search ........... 370/335, 370/320, 441, 342, 259
See application file for complete search history.

(56) References Cited

U.S. PATENT DOCUMENTS

| | | | | |
|---|---|---|---|---|
| 6,175,560 B1* | 1/2001 | Bhagalia et al. | ............ | 370/342 |
| 6,222,819 B1* | 4/2001 | Lysejko et al. | ............ | 370/209 |
| 6,310,865 B1* | 10/2001 | Ohki | ............ | 370/311 |
| 6,381,211 B1* | 4/2002 | Lysejko et al. | ............ | 370/209 |
| 6,430,169 B1* | 8/2002 | Harms et al. | ............ | 370/335 |
| 6,608,838 B1* | 8/2003 | Ozluturk | ............ | 370/441 |
| 6,687,238 B1* | 2/2004 | Soong et al. | ............ | 370/335 |
| 6,693,853 B1* | 2/2004 | Nagano et al. | ............ | 369/2 |
| 6,757,334 B1* | 6/2004 | Feher | ............ | 375/259 |
| 6,763,244 B1* | 7/2004 | Chen et al. | ............ | 455/522 |
| 6,791,995 B1* | 9/2004 | Azenkot et al. | ............ | 370/436 |
| 6,798,759 B1* | 9/2004 | Ozluturk | ............ | 370/335 |
| 6,810,029 B1* | 10/2004 | Ozluturk | ............ | 370/329 |
| 7,002,945 B1* | 2/2006 | Ichiyoshi | ............ | 370/342 |
| 7,050,419 B1* | 5/2006 | Azenkot et al. | ............ | 370/347 |
| 2001/0046266 A1* | 11/2001 | Rakib et al. | ............ | 375/259 |
| 2002/0154620 A1* | 10/2002 | Azenkot et al. | ............ | 370/347 |

* cited by examiner

*Primary Examiner*—Hassan Kizou
*Assistant Examiner*—Jay P. Patel

(57) ABSTRACT

A method and system for transmitting and receiving multiple types of signals on a multifunctional base station. The multiple types of signals may include fixed wireless signals, cellular signals, and back haul signals. The multifunctional base station may sample an analog signal as received from the antenna and transmit a digital signal over a network interface. Alternatively, the multifunctional base station may convert a digital signal as received from the network interface into an analog signal and transmit the analog signal over an air interface.

15 Claims, 3 Drawing Sheets

DYNAMIC ADAPTIVE MULTIFUNCTIONAL BASE STATION FOR WIRELESS NETWORKS

BACKGROUND

1. Field of the Invention

This invention relates to telecommunications services and more particularly to a dynamic adaptive multifunctional base station for wireless networks.

2. Description of the Related Art

Wireless networks are an increasingly popular means of personal communications. People are using mobile terminals such as cellular telephones and fixed wireless terminals so that they can readily stay in touch with others.

The wireless network typically includes a base station. The base station produces a radiation pattern defining a cell and/or sector in which the mobile terminal or the fixed wireless terminal operates. The radiation pattern enables the base station to transmit and receive signals of a single type. For example, the base station may be designed to transmit and receive fixed wireless signals for data communications with the fixed wireless terminal. Alternatively, the base station may transmit and receive cellular signals for speech and data communications with the mobile terminal. Still alternatively, the base station may be designed to transmit and receive back haul signals for data communications with another base station.

The base station is typically connected to a digital network. The digital network enables the base station to communicate with a mobile switching center within the wireless network. The mobile switching center sets up and connects calls between the mobile terminal and/or the fixed wireless terminal and a remote device.

The base station has a basic architecture. The basic architecture consists of a transmit/receive switch, a radio frequency section, a sampling and reconstruction system, and a signal processing module. The transmit/receive switch, radio frequency section, sampling and reconstruction system, and signal processing module are all serially coupled together so as to transmit and receive signals over the air interface.

In a receive mode, the base station receives an analog signal from the air interface and transmits a digital signal over the digital network. The transmit/receive switch receives the analog signal from the air interface. The analog signal is demodulated at the radio frequency section. The sampling and reconstruction section has an analog-to-digital converter for converting the analog signal into the digital signal. Then, the digital signal is formatted at the signal processing module according to a digital transmission protocol and transmitted over the digital network.

In a transmit mode, the base station receives a digital signal from the digital network and transmits an analog signal over the air interface. The signal processing module takes the digital signal and formats it according to an analog transmission protocol. The digital signal is then converted to the analog signal at the sampling and reconstruction system. The sampling and reconstruction system has a digital-to-analog converter for converting the digital signal into the analog signal. Then, the analog signal is modulated at the radio frequency section and then transmitted over the air interface at the transmit/receive switch.

The basic architecture allows a base station to transmit and receive a single type, either a fixed wireless, cellular, or back haul signal, between the air interface and the digital network.

SUMMARY

The present invention stems from a realization of the limited functionality of existing base stations. The basic architecture of existing base stations allows for exchanging signals of a single type, e.g., fixed wireless signals, cellular signals, or back haul signals over the air interface. If more than one type of signal is to be exchanged over the air interface, then the wireless network uses more than one base station. Thus, it would be advantageous to have an efficient method and system for transmitting and receiving more than one type of signal on a single base station.

In accordance with a principle aspect of the present invention, fixed wireless signals, cellular signals, and back haul signals may be transmitted and received by a dynamic adaptive multifunctional base station. The dynamic adaptive multifunctional base station (herein referred to as the "multifunctional base station") can transmit and receive signals with varying modulation schemes and varying frequencies.

The multifunctional base station may have a transmit/receive switch, a transceiver system, a codec module, a signal processing module, and a network interface. The transmit/receive switch may transmit or receive an analog signal. The analog signal may be defined by a spectrum. The spectrum identifies a minimum frequency of the analog signal and a maximum frequency of the analog signal. Thus, the analog signal occupies a range of frequencies extending from the minimum frequency and the maximum frequency.

The transceiver system may be configured with a receive subsystem and a transmit subsystem. The receive subsystem may receive the analog signal from the transmit/receive switch. The transceiver system may have at least one RF processing module. A band pass filter on an RF processing module may pass the analog signal to the ultra high-speed transceiver. Alternatively, the band pass filter may reject the analog signal and a separate band pass filter on another RF processing module may pass the analog signal to a shifting module. The shifting module may shift the spectrum of the analog signal so that the spectrum extends over a range of frequencies that is lower than what the spectrum extended over before being shifted. Then, the shifting module may pass the analog signal, as shifted, to the ultra high-speed transceiver.

At the ultra-high speed transceiver, the analog-to-digital converter may sample the analog signal. A codec module may then add error codes, e.g., error detection codes and error correction codes, to the digital signal. Then, the signal processing module may pass the digital signal to the network interface. The signal processing module may also suppress a carrier wave originally in the analog signal and additionally format the digital signal according to a digital transmission protocol of the digital network.

Unlike the receive subsystem, the transmit subsystem may receive a digital signal from a network interface and pass the digital signal to the signal processing module. The signal processing module may, in turn, pass the digital signal to a codec. Additionally, the signal processing module may format the digital signal according to an analog transmission protocol of an analog signal to be transmitted. The signal processing module may also add a pattern of bits into the digital signal that identifies the analog transmission protocol. When the signal processing module passes the digital signal to the codec, the codec may detect errors in the digital signal and, preferably, correct the errors. Additionally, the codec may pass the digital signal to the ultra high speed-transceiver. The ultra high-speed transceiver may select an analog-to-digital converter to convert the digital signal into the analog signal. The analog-to-digital converter that is selected may be based on the pattern of bits in the digital signal that identifies the analog transmission protocol.

The digital signal may be converted to an analog signal at the digital-to-analog converter on the ultra high-speed transceiver. The analog signal output may then pass through at least one band pass filter. The at least one band pass filter may pass the analog signal through an up conversion module, which shifts the analog signal to a carrier frequency. Then, the analog signal may be passed to an amplifier. The amplifier may amplify the analog signal and additionally add a carrier wave to the analog signal. The transmit/receive switch may then transmit the analog signal over the air interface.

These as well as other aspects and advantages will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
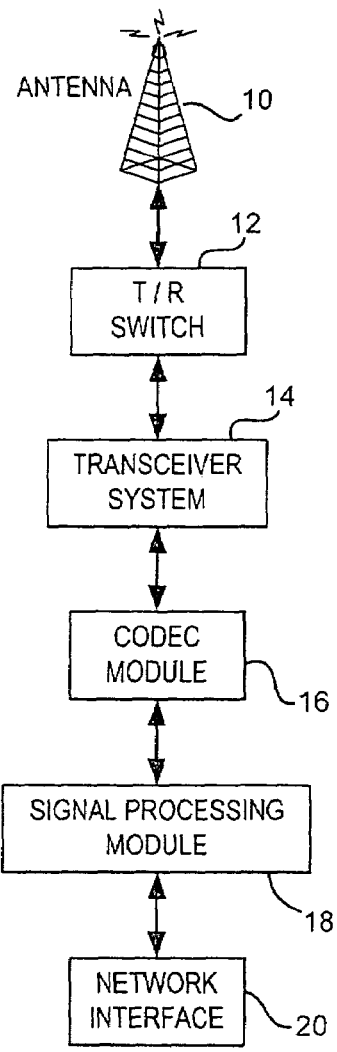
FIG. 1 is a block diagram of an exemplary multifunctional base station.

Referring to the drawings, FIG. 1 is a block diagram of an exemplary multifunctional base station. Those skilled in the art will appreciate that many of the elements described herein are functional entities that may be implemented as discrete components or in conjunction with other components, in any suitable combination or location. Still further, the various functions described herein as being performed by one or more entities may be carried out by one or more processors programmed to execute an appropriate set of computer instructions stored in memory. Provided with the present disclosure, those skilled in the art can readily prepare the appropriate set of computer instructions (e.g., software) to perform such functions.

The multifunctional base station may be configured to transmit and receive multiple types of signals over an air interface of the wireless network. The multiple types of signals may include fixed wireless signals, cellular signals, and/or back haul signals. The multifunctional base station may modulate the multiple types of signals at a carrier frequency such that there is no overlap in frequency between the signals.

A fixed wireless signal facilitates digital communications at data rates of hundreds of kilobits per second. The fixed wireless signal is a high bandwidth signal (e.g., 10 MHz) having a high carrier frequency (e.g., 38 GHz). The fixed wireless signal is typically transmitted and received at a "fixed" wireless digital transmitter/receiver. The fixed wireless digital transmitter/receiver may be mounted on a rooftop of a home, for example.

The cellular signal is suited for speech and data communications with a mobile terminal, e.g., a cellular telephone or personal computer with wireless modem. The cellular signal may be a spread spectrum signal that conforms to code division multiple access (CMDA), IS-95, or IS-2000 protocol. The cellular signal may have a bandwidth ranging from 1.25 MHz to 5 MHz and operate at a carrier frequency of approximately 800 to 900 MHz or 1.8 to 1.9 GHz, depending on the protocol.

The back haul signal may carry network control information between base stations. The back haul signal is typically a microwave signal. The microwave signal may have a carrier frequency of 5.7 GHz and carry data at a rate of 45 Mbps between the base stations. The microwave signal may, for example, conform to T3 protocol.

The fixed wireless, cellular, and back-haul signals may have different bandwidths, and/or different carrier frequencies, and may carry different types of content from what is described above. The multifunctional base station may also transmit and receive other types of signals. The multifunctional base station may transmit and receive, for example, 802.11 wireless local area network signals, quadrature amplitude modulated (QAM) signals, and/or quadrature phase amplitude modulated (QPSK) signals.

As shown in FIG. 1, the multifunctional base station may include an antenna 10, a transmit/receive (T/R) switch 12, a transceiver system 14, a coder/decoder (codec) module 16, a signal processing module 18, and a network interface 20. The multifunctional base station may operate in a receive mode and/or a transmit mode.

In the receive mode, the antenna 10 may receive an analog signal over the air interface and transmit a digital signal over the network interface 20. The transmit/receive switch 12 may pass the analog signal that is received from the antenna 10 to the transceiver system 14. An analog-to-digital converter (ADC) on the transceiver system 14 may convert the analog signal into a digital signal. The ADC may sample the analog signal at least at a Nyquist rate into the digital signal. The Nyquist rate may be a sampling rate of at least twice a highest frequency component in the analog signal. The digital signal may then be passed to the codec module 16. The codec module 16 may insert error codes, e.g., error correction and error detection codes, at predefined positions into the digital signal. The error codes may include Trellis coding, forward error correction (FEC) codes, and cyclic redundancy check (CRC) codes. The signal processing module 18 may then pass the digital signal to the network interface 20. The signal processing module 18 may also format the digital signal, for example, packetize the digital signal according to asynchronous transfer mode (ATM) protocol, for transmission over a digital network. The network interface 20 may output the digital signal.

In the transmit mode, the multifunctional base station may receive a digital signal from the network interface 20 and transmit an analog signal over the air interface. The network interface 20 may receive a digital signal from the digital network. The network interface 20 may then pass the digital signal to the signal processing module 18. The signal processing module 18 may format the digital signal so that the analog signal that is transmitted conforms to an analog transmission protocol, e.g., CMDA, IS-95, IS-2000, QPSK, or QAM. The signal processing module 18 may then pass the digital signal to the codec 16. The codec 16 may perform error detection and, preferably error correction, on the digital signal (e.g., Viterbi decoding, FEC decoding, or CRC decoding). A digital-to-analog converter (DAC) on the transceiver system 14 may then convert the digital signal to the analog signal. The analog signal may be output to another entity at the transmit/receive switch 12. The entity may be, for example, a fixed wireless terminal, a mobile terminal, or another base station.

Figure 2:
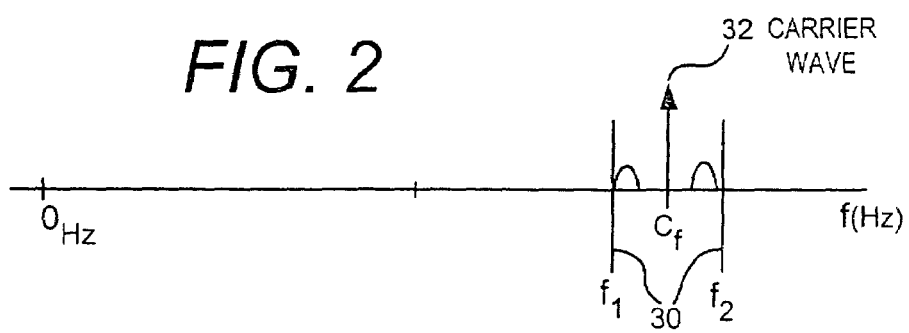
FIG. 2 is a frequency domain representation of signals that are received by the exemplary multifunctional base station.

FIG. 2 illustrates a frequency domain representation of the exemplary analog signal that may be received by the multifunctional base station. The exemplary analog signal may be the fixed wireless signal, cellular signal, or back haul signal, for example. The exemplary analog signal may have a spectrum that extends from a minimum frequency $f_1$ of the analog signal to a maximum frequency $f_2$ of the analog signal. The analog signal extends over a range of frequencies between the minimum frequency and the maximum frequency. The analog signal is modulated on a carrier wave 32 at a carrier frequency $C_f$. The carrier wave 32 may modulate the spectrum 20 so that it may be carried over the air interface.

Figure 3:
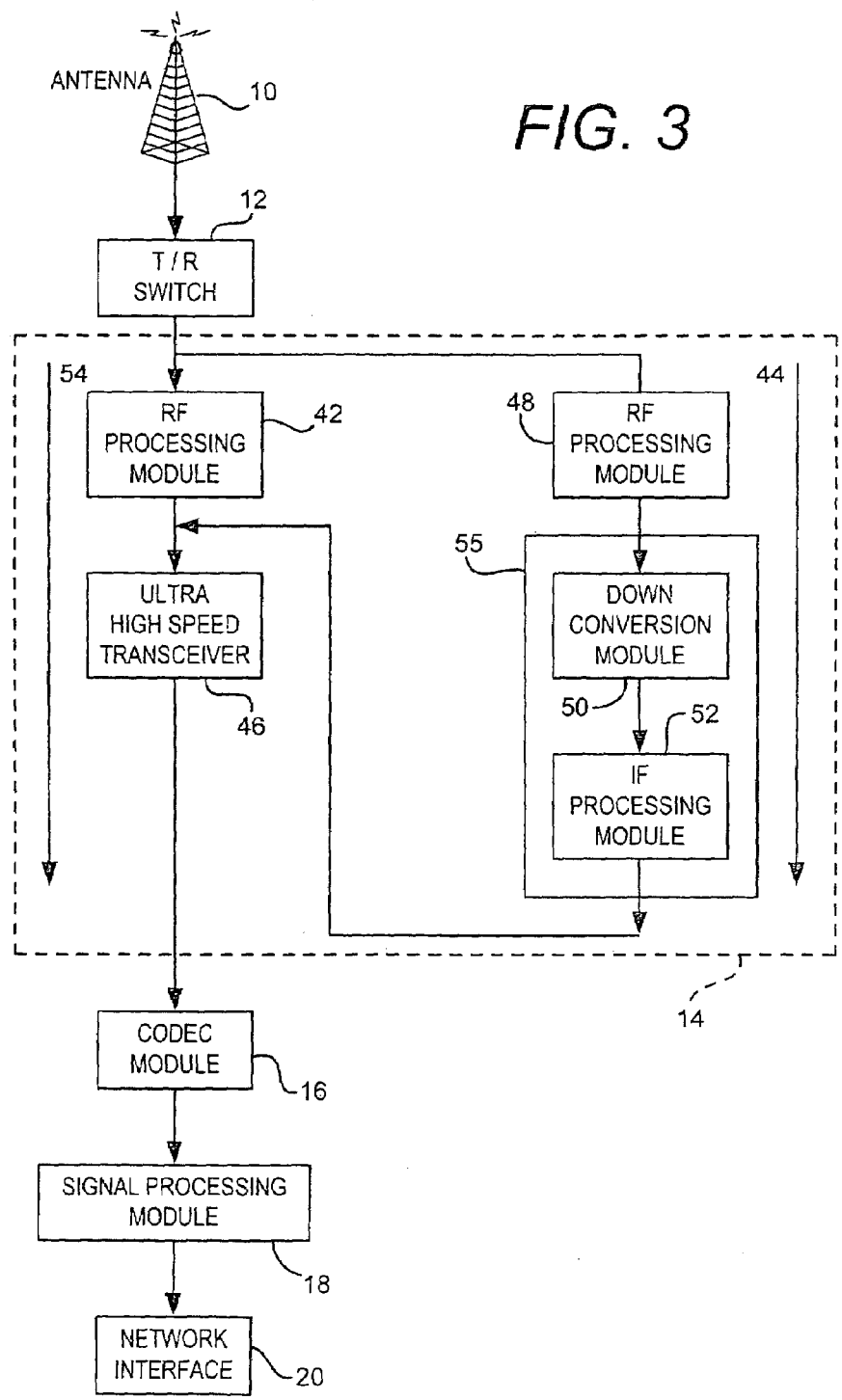
FIG. 3 is a block diagram of an analog receive subsystem of the exemplary multifunctional base station of FIG. 1.

FIG. 3 is a block diagram of a receive subsystem of the exemplary multifunctional base station. The block diagram illustrates how the exemplary analog signal of FIG. 2 is processed by the multifunctional base station. The receive subsystem may include the transmit/receive (T/R) switch 12, the transceiver system 14, the codec module 16, the signal processing module 18, and the network interface 20. The transceiver system 14 may have various modules for converting the analog signal that is received from the transmit/receive switch 12 into the digital signal that is transmitted over the network interface 20. The modules may include a radio frequency (RF) processing module 42 coupled to an ultra high-speed transceiver 46 and an RF processing module 48, downsampling module 50, and intermediate frequency (IF) module coupled to the ultra high-speed transceiver 46.

The ultra high-speed digital transceiver 46 may be a superconducting or semiconductor chip which can sample a wide variety of analog signals into digital signals. The ultra high-speed transceiver 46 may have at least one analog-to-digital converter (ADC) that samples an analog signal at least at the Nyquist rate. For example, if the analog signal is a 1.9 GHz cellular signal, then the ultra high-speed transceiver 46 may have an ADC that can sample the cellular signal at least at a rate of 2.8 GHz. Likewise, if the analog signal is an 800 MHz cellular signal, then the ultra high-speed transceiver may have an ADC that can sample the cellular signal at least at a rate of 1.6 GHz.

The analog signal may pass through one of multiple paths 44, 54 on the multifunctional base station before reaching the ultra high-speed transceiver 46. The path that the analog signal passes through may depend on whether an ADC of the ultra high-speed transceiver is, in fact, capable of sampling the analog signal at least at the Nyquist rate.

An analog signal that can be sampled by an ADC on the ultra high-speed transceiver least at the Nyquist rate may follow path 54 to the ultra high-speed transceiver. The ADC on the ultra high-speed transceiver 46 may directly sample the analog signal. An analog signal that cannot be sampled by an ADC on the ultra high-speed transceiver at least at the Nyquist rate may follow path path 44 to the ultra high-speed transceiver. Path 44 allows for down converting the spectrum of the analog signal before the analog signal reaches the ultra high-speed transceiver 46.

The exemplary embodiment illustrated by FIG. 3 is not limited by the two paths that are illustrated. Each type of analog signal that is received by the multifunctional base station may pass through path 54, path 44, or a like path to the ultra high-speed transceiver 46. For example, a cellular signal may follow path 44, a fixed wireless signal may follow path 54, and a back haul signal may pass through a path like path 44 (but not shown). Alternatively, the exemplary multifunctional base station may just have path 54 if an ADC can sample all the signals that are received. Other variations are also possible.

Assuming two paths 54, 44, a band pass filter in each of the RF processing modules 42, 48 may determine whether the analog signal passes through path 54 or path 44. The band pass filter may be designed in accordance with the multiple types of analog signals that are received by the multifunctional base station. The band pass filter may pass or reject analog signals depending on whether the analog signal can be sampled by the ADC on the ultra high-speed transceiver 46.

An analog signal that passes through the band pass filter of RF processing module 42 can be sampled by the ADC at least at the Nyquist rate. After passing through the band pass filter, a low noise amplifier (LNA) on the RF processing module 42 may increase gain of the analog signal without introducing excessive noise. The analog signal may then be sent to the ultra high-speed transceiver 46. Each ADC on the ultra high-speed transceiver 46 may also have band pass filter at its input. The band pass filter may allow the analog signal to pass to the ADC on the ultra high-speed transceiver, which can sample the analog signal at least at the Nyquist rate. The Nyquist rate is twice the maximum frequency of the spectrum of the analog signal. The band pass filter typically has a bandwidth of ½ the sampling rate of the ADC to which it is connected.

The digital signal may be passed to the codec module 16. The codec module 16 may add error codes, e.g., error correction or error detection codes, to the digital signal. The digital signal may then be passed to the signal processing module 18. The signal processing module 18 may be a digital signal processor (DSP) or an application specific integrated circuit (ASIC), for example. The DSP may be a programmable semiconductor chip that is designed to process the digital signal in real time. The ASIC may be a custom designed chip to process the digital signal.

The signal processing module 18 may pass the digital signal to the network interface 20. The signal processing module 18 may also perform additional functions. For example, the signal processing module 18 may also suppress a carrier wave modulated at the carrier frequency using a notch filter. The notch filter may be a circuit on the ASIC or software on the DSP that blocks a specific band of frequencies, i.e., the carrier wave at the carrier frequency. Additionally, the signal processing module 18 may downsample the digital signal. Downsampling is a process of discarding samples (e.g., bits) of the digital signal. Still further, the signal processing unit may format, e.g., as packets or frames, the digital signal according to a digital transmission protocol of the digital network. The digital signal may then be output over the network interface 20.

A separate band pass filter on the RF processing module 48 may pass an analog signal that is rejected by the band pass filter on RF processing module 42. The analog signal may follow path 44 on the multifunctional base station. The analog signal may pass through the RF processing module 48 and a shifting module 55 having the down conversion module 50 and the IF processing module 52. The spectrum of the analog signal may have to be shifted because otherwise the analog signal cannot be sampled by an ADC on the ultra high-speed transceiver. The analog signal may then pass to the ultra high-speed transceiver 46.

The RF processing module 48, like RF processing module 42, may have an LNA. The LNA may amplify the analog signal without introducing excessive noise. The down conversion module 50 may have a local oscillator with external control. The down conversion module 50 may multiply in the time domain (e.g., convolve in the frequency domain) the analog signal with a local oscillator frequency to shift the spectrum of the analog signal to be centered at the local oscillator frequency. The local oscillator frequency may be a frequency greater than zero Hz, but less than the carrier frequency of the analog signal. As a result, the spectrum, centered at the local oscillator frequency, may extend over a range of frequencies that is lower than the spectrum before being shifted.

The IF processing module 52 may further prepare the analog signal for sampling at an ADC on the ultra high-speed transceiver 46. The IF processing module may further shift the spectrum of the analog signal. The IF processing module 52, like the down conversion module 50, may also use a local oscillator to further shift the spectrum of the analog signal. The local oscillator frequency of the IF processing module 52 may be lower than the local oscillator frequency of the down conversion module 50. As a result, the IF processing module 52 may shift the spectrum so that the spectrum extends over a range of frequencies that is even lower than the spectrum as shifted by the down conversion module 50

Other variations are also possible for shifting the spectrum of the analog signal. The exemplary multifunctional base station may require shifting the spectrum more than two times so that the ADC can sample the analog signal at least at the Nyquist rate. Alternatively, the exemplary multifunctional base station may require shifting the spectrum just one time before the ADC can sample the analog signal at least at the Nyquist rate. Additionally, the spectrum of the analog signal may be shifted using methods other than those already described.

An ADC of the ultra high-speed transceiver 46 may then sample the analog signal output from the IF processing module 52 into the digital signal. An ADC may sample the analog signal at least at the Nyquist rate. The Nyquist rate may be at least twice the highest frequency component of the analog signal, as shifted. In other words, the Nyquist rate may be the highest frequency of the range of frequencies over which the spectrum, as shifted, extends.

The digital signal may then be passed through the codec module 16. The codec module 16 may at least one error code to the digital signal. The signal processing module 18 may then format the digital signal to conform with the digital transmission protocol of the digital network. The digital signal may then be output over the network interface 20.

Figure 4:
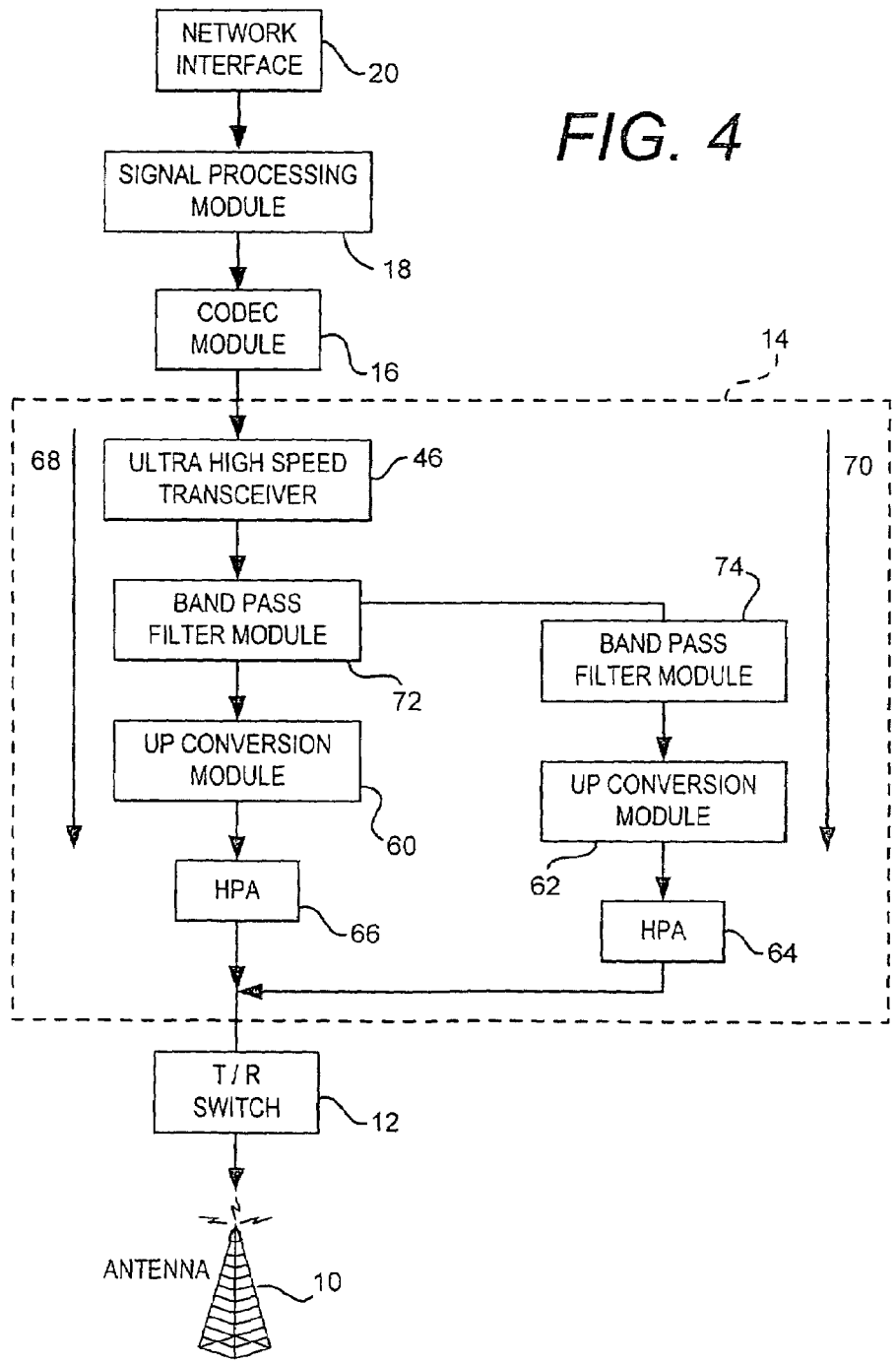
FIG. 4 is a block diagram of a digital transmit subsystem of the exemplary multifunctional base station of FIG. 1.

FIG. 4 is a block diagram of a transmit subsystem of the exemplary multifunctional base station. The block diagram illustrates how a digital signal as received from the digital network is processed by the exemplary multifunctional base station. The transmit subsystem may include the network interface 20, the signal processing module 18, the codec module 16, the transceiver system 14, and the transmit/receive 12 switch. The transceiver system 14 may have various modules for converting a digital signal that is received from the network interface 20 into an analog signal that is transmitted by the transmit/receive switch 12. The various modules may include the ultra high-speed transceiver 46, which is coupled to band pass filter modules 72, 74, up conversion modules 60, 62, and amplifiers, e.g., high power amplifiers (HPA) modules 64, 66.

The network interface 20 may receive the digital signal and pass the digital signal to the signal processing module 18. The signal processing module 18 then pass the digital signal to codec module 16. The signal processing module 18 may perform additional functions. For example, the signal processing module 18 may format the digital signal so that the analog signal that is transmitted over the air interface conforms to an analog transmission protocol, e.g., CDMA, IS-95, IS-2000, QAM, QPSK. Additionally, the signal processing module 18 may add a pattern of bits to the digital signal. The pattern may added in a predefined position to the digital signal. The pattern of bits (e.g., a predefined sequence of bits) may uniquely identify the analog transmission protocol to which the digital signal has been formatted. The pattern may be used by the ultra high-speed transceiver 46 in converting the digital signal into the analog signal.

The codec module 16 may receive the digital signal from the signal processing module 18. The codec module 16 may apply error correction and error detection techniques, e.g., Viterbi decoding, FEC decoding, CRC coding, to error codes in the digital signal to detect and correct errors in the digital signal.

In addition to the at least one ADC on the ultra high-speed transceiver 46, the ultra high-speed transceiver may have at least one digital to analog converter (DAC). The at least one DAC on the ultra high-speed transceiver 46 may convert the digital signal into the analog signal. The ultra high-speed transceiver 46 may have a processor or circuitry to examine the pattern placed the digital signal by the signal processing module 18 to determine which of the at least one DAC should convert the digital signal into the analog signal. For example, the ultra high-speed transceiver may maintain a table that maps a pattern to a particular DAC that can convert the digital signal into the analog signal that is identified by the pattern. Other arrangements are also possible.

Each DAC may be designed to produce a particular analog signal, e.g., fixed wireless signals, cellular signals, or back haul signals, from the digital signal. As the pattern identifies the analog transmission protocol of the analog signal to be produced, the ultra high-speed transceiver 46 may use the pattern to determine the appropriate DAC to convert the digital signal into the analog signal and responsively pass the digital signal to that DAC.

The analog signal that is generated by the DAC on the ultra high-speed transceiver 46 may then pass through band pass filter module 72, 74. Band filter module 72, 74 may each have a band pass filter that passes analog signals of a particular type. The band pass filter may be designed so that band pass filter module 72 passes the analog signal through path 68 according to the spectrum (i.e., type) of the analog signal. For example, a fixed wireless signal to be transmitted may be passed through path 68 while a cellular signal to be transmitted may be processed through path 70.

As already noted above, the multiple types of analog signal that can be transmitted by the multifunctional base station may not overlap in frequency. Thus, each type of analog signal that is transmitted by the multifunctional base station may take a path similar to that of paths 68 or 70 to the transmit/receive switch 12.

Moreover, the exemplary multifunctional base station may not necessarily have two paths like path 68 or path 70. The number of paths that the exemplary multi functional base station may have to the transmit/receive switch 12 may depend on the number of types of signals that are transmitted. Thus, the multifunctional base station may have only one path, e.g., path 68, or more than the two paths 68, 70. Other variations are also possible.

Assuming the exemplary multifunctional base station has two paths, 68, 70, a particular analog signal may be passed by the band pass filter module 72 to an up conversion module 60. The up conversion module 60 may shift the spectrum of the analog signal so that it is centered at a carrier frequency. The up conversion module 60 may have a local oscillator that generates a local oscillator frequency. The spectrum of the analog signal may be multiplied in time (i.e., convolved in frequency) by the local oscillator frequency so that the spectrum of the analog signal is centered at the carrier frequency. Then, the HPA module 66 may amplify the analog signal for transmission over the air interface. Additionally, the HPA module 66 may modulate a carrier wave onto the analog signal. The transmit/receive switch 12 may transmit the analog signal over the air interface.

Following path 70, another type of analog signal may be passed by band pass filter module 74 to up conversion module 26 and HPA 64. Because the analog signal is a different type from the analog signal of path 68, the up conversion module 26 of path 70 may, but not necessarily, shift the analog signal to a different carrier frequency than that of up conversion module 26. The HPA 64 may then amplify the signal for transmission. Additionally, the HPA 64 may modulate the carrier wave onto the analog signal. The transmit/receive switch 12 may then transmit the analog signal over the air interface.

Exemplary embodiments of the present invention have thus been illustrated and described. It will be understood, however, that changes and modifications may be made to the invention as described without deviating from the spirit and scope of the invention, as defined by the following claims.

I claim:

1. A multifunctional base station comprising:
   a transmit/receive switch;
   at least one RF processing module, the at least one RF processing module being coupled to the transmit/receive switch;
   an ultra high-speed transceiver, the ultra high-speed transceiver being coupled to the at least one RF processing module;
   a codec module, the codec module being coupled to the ultra high-speed transceiver;
   a signal processing module, the signal processing module being coupled to the codec;
   a network interface, the network interface being coupled to the signal processing module;
   a shifting module; and
   a separate RF processing module;
   wherein the transmit/receive switch receives an analog signal from an air interface of a wireless network, the analog signal having a spectrum extending from a first frequency to a second frequency, the first frequency being lower than the second frequency;
   wherein an RF processing module has a band pass filter that passes the spectrum of the analog signal to the ultra high-speed transceiver;
   wherein the ultra high-speed transceiver has at least one analog-to-digital converter for sampling the analog signal at least at twice the second frequency without the spectrum being shifted in frequency;
   wherein the codec module adds at least one error code to the digital signal;
   wherein the signal processing module passes the digital signal to the network interface;
   wherein the separate RF processing module is further coupled to the shifting module and the shifting module is coupled to the ultra high-speed transceiver;
   wherein the transmit/receive switch further receives a separate analog signal from the air interface, the separate analog signal having a separate spectrum extending from a third frequency to a fourth frequency, the third frequency being higher than the second frequency and the fourth frequency being higher than the third frequency;
   wherein the band pass filter of the RF processing module rejects the separate analog signal;
   wherein the separate RF processing module has a separate band pass filter which passes the separate analog signal;
   wherein the shifting module shifts the separate spectrum to a shifted separate spectrum, the shifted separate spectrum extending from a fifth frequency to a sixth frequency, the fifth frequency being lower than the third frequency and the sixth frequency being lower than the fourth frequency; and
   wherein the at least one analog-to-digital converter samples the separate shifted spectrum of the separate analog signal at a separate sample rate of at least twice the sixth frequency.

2. The multifunctional base station of claim 1, wherein the shifting module comprises a down conversion module and an IF processing module.

3. The multifunctional base station of claim 1, wherein the at least one error code is selected from the group consisting of a Trellis code, an FEC code, and a CRC code.

4. The multifunctional base station of claim 1, wherein the signal processing module further suppresses a carrier wave of the analog signal and downsamples the digital signal.

5. The multifunctional base station of claim 1, wherein the analog signal is a fixed wireless signal.

6. The multifunctional base station of claim 1, wherein the analog signal is a cellular signal.

7. The multifunctional base station of claim 1, wherein the analog signal is a back haul signal.

8. A method for processing an analog signal on a base station, the method comprising:
   receiving the analog signal from an air interface of a wireless network, the analog signal having a spectrum extending from a first frequency to a second frequency, the first frequency being lower than the second frequency;
   passing the spectrum of the analog signal through a band pass filter of an RF processing module to an ultra high-speed transceiver;
   sampling the analog signal at least at twice the second frequency, the analog signal being sampled by an analog-to-digital converter of the ultra high-speed transceiver without the spectrum being shifted in frequency;
   adding at least one error code into the digital signal at a codec module;
   passing the digital signal through a signal processing module; and
   outputting the digital signal at a network interface.

9. The method of claim 8, wherein passing the digital signal through the signal processing module comprises suppressing a carrier wave of the analog signal and downsampling the digital signal.

10. The method of claim 8 wherein the at least one error code is selected from the group consisting of a Trellis code, FEC code, and a CRC code.

11. The method of claim 8, further comprising:
   receiving a separate analog signal from the transmit/receive switch, the separate analog signal having a separate spectrum extending from a third frequency to a fourth frequency, the third frequency being higher than the second frequency and the fourth frequency being higher than the third frequency;

rejecting the separate analog signal at the band pass filter of the RF processing module;

passing the separate analog signal at a separate band pass filter of a separate RF processing module;

shifting the separate spectrum to a shifted separate spectrum, the shifted separate spectrum extending from a fifth frequency to a sixth frequency, the fifth frequency being lower than the third frequency and the sixth frequency being lower than the fourth frequency; and sampling the separate shifted spectrum of the separate analog signal at the at least one analog-to-digital converter of the ultra high-speed transceiver, the analog signal being sampled at a sample rate of at least twice the sixth frequency.

12. A method for processing a digital signal on a base station, the method comprising:

receiving a digital signal at a network interface;

passing the digital signal through a signal processing module;

performing error detection on the digital signal at a codec;

making a determination of an analog transmission protocol for an analog signal to be transmitted by the base station, the analog transmission protocol being identified by a pattern of bits in the digital signal;

passing the digital signal to at least one digital-to-analog converter based on the determination of the analog transmission protocol;

converting the digital signal to an analog signal by the at least one digital-to-analog converter;

passing the analog signal to an up conversion module;

shifting a spectrum of the analog signal to a carrier frequency at the up conversion module;

amplifying the analog signal at an amplifier;

modulating a carrier wave onto the analog signal; and outputting the analog signal at a transmit/receive switch.

13. The method of claim 12, wherein the analog transmission protocol is selected from the group consisting of CDMA, IS-95, IS-2000, QAM, and QPSK.

14. The method of claim 12, wherein the at least one error code is selected from the group consisting of a Trellis code, FEC code, and a CRC code.

15. The method of claim 12, further comprising inserting the pattern of bits that identifies the analog transmission protocol into the digital signal, the pattern of bits being inserted at the signal processing module.

* * * * *